(12) United States Patent
Fleure et al.

(10) Patent No.: US 8,416,640 B2
(45) Date of Patent: Apr. 9, 2013

(54) METHODS FOR OPTIMIZING OFFSET DISTRIBUTION OF CROSS SPREAD 3-D SEISMIC SURVEYS USING VARIABLE SHOT LINE LENGTH

(75) Inventors: Thomas J. Fleure, Missouri City, TX (US); Richard Degner, Houston, TX (US); Jonathan Nelson, Missouri City, TX (US)

(73) Assignee: Global Geophysical Services, Missouri City, TX (US)

( * ) Notice: Subject to any disclaimer, the term of this patent is extended or adjusted under 35 U.S.C. 154(b) by 799 days.

(21) Appl. No.: 12/426,233

(22) Filed: Apr. 18, 2009

(65) Prior Publication Data

US 2010/0265793 A1  Oct. 21, 2010

(51) Int. Cl.
*G01V 1/00* (2006.01)
*G01V 1/38* (2006.01)

(52) U.S. Cl.
USPC .................................. 367/56; 367/15; 367/20

(58) Field of Classification Search .............. 367/15–20, 367/58, 62, 56; 181/108, 109
See application file for complete search history.

(56) References Cited

U.S. PATENT DOCUMENTS

| | | | |
|---|---|---|---|
| 5,402,391 A | 3/1995 | Cordsen | 367/56 |
| 5,598,378 A * | 1/1997 | Flentge | 367/56 |
| 6,026,059 A | 2/2000 | Starr | 367/22 |
| 6,028,822 A | 2/2000 | Lansley et al. | 367/62 |
| 7,489,590 B2 | 2/2009 | Grion | 367/24 |
| 2009/0122640 A1* | 5/2009 | Hill et al. | 367/16 |
| 2010/0157727 A1* | 6/2010 | Woodard et al. | 367/15 |

\* cited by examiner

*Primary Examiner* — Isam Alsomiri
*Assistant Examiner* — Krystine Breier
(74) *Attorney, Agent, or Firm* — Thomas F. Woods (57) ABSTRACT

A method for acquiring three-dimensional seismic data for sub-surface geologic features wherein a seismic source array is moved along a survey pattern having a plurality of source lines of unequal lengths that are substantially parallel to each other and intersect a receiver line. The survey pattern can be repeated in an overlapping and interleaved fashion to survey a larger area.

21 Claims, 10 Drawing Sheets

METHODS FOR OPTIMIZING OFFSET DISTRIBUTION OF CROSS SPREAD 3-D SEISMIC SURVEYS USING VARIABLE SHOT LINE LENGTH

BACKGROUND OF THE INVENTION

1. Field of the Invention

The invention relates generally to marine seismic surveying. In particular aspects, the invention relates to systems and methods for conducting a reflection seismic survey.

2. Description of the Related Art

Seismic exploration is used to survey subterranean geological formations to determine the location of hydrocarbon formations within the earth. Reflection seismology is used to estimate the properties of the subsurface from reflected seismic waves. In reflection seismology, generated acoustic waves (i.e., shots) are propagated down through subterranean strata and reflect from acoustic impedance differences at the interfaces between various subterranean strata. Because many commercially viable hydrocarbon formations are located beneath bodies of water, marine seismic surveys have been developed. Marine seismic survey systems have been described in, for example, U.S. Pat. No. 6,026,059 issued to Starr.

The presence of background noise and multiple seismic signals tends to cover up the desired signals (traces) which reveal actual subsurface geological structure. As a result, it has become conventional to enhance the desired traces by collecting multiple signals having the same common midpoint (CMP). "Fold" quantifies the number of seismic traces that are recorded at a given CMP. Higher fold generally improves data quality as the traces are summed together such that the primary signal is enhanced by in-phase addition while ambient noise and interference are reduced. In 3-dimensional surveys, data is gathered by taking all seismic traces from an area around each CMP and assigning these traces to a "bin," which is a discrete rectangular area of the surface area being surveyed. A 3-dimensional "image" of the subterranean structure can then be modeled from the bin data.

In a typical ocean bottom seismic survey system, a source vessel tows a source array through a body of water. The source array contains a number of seismic sources, such as air guns, which can create a seismic signal as known in the art. The source array produces seismic signals (shots) that are propagated down through the water and into the strata beneath the sea floor. As the seismic signals encounter the various subterranean strata, they are reflected back and are detected by one or more seismic receiver devices which record the signals and permit them to be analyzed. In an ocean bottom 3D seismic survey, it is typical to have a plurality of seismic recorders incorporated into an ocean bottom cable that is disposed in a linear fashion along the sea floor.

SUMMARY OF THE INVENTION

The present invention provides an ocean bottom seismic 3D survey system which includes a plurality of seismic signal receivers that are disposed in one or more linear arrays upon the sea floor. A source vessel tows a single or plurality of seismic source arrays in the water above the receivers. The source array is towed in a pattern of substantially parallel source lines that intersect the arrays of receivers. In preferred embodiments, the source lines are substantially perpendicular to the linear receiver arrays. Further, in preferred embodiments, the source lines of the pattern have variable, unequal lengths. At least one of the source lines has a first length, and at least one of another of the source lines has a second length that is less than the first length.

In a currently preferred embodiment, the invention features a survey pattern made up of a series of source lines having three unequal lengths: long, intermediate, and short. In a further aspect of the present invention, it is preferred that the source lines in the pattern occur in a particular sequence. A currently preferred sequence for the source lines is long-intermediate-short-intermediate. In a further currently preferred embodiment, the long source line is four units in length, the intermediate source line is three units in length, and the short source line is two units in length.

BRIEF DESCRIPTION OF THE DRAWINGS

For detailed understanding of the invention, reference is made to the following detailed description of the preferred embodiments, taken in conjunction with the accompanying drawings in which reference characters designate like or similar elements throughout the several figures of the drawings.

DETAILED DESCRIPTION OF THE PREFERRED EMBODIMENTS

Figure 1:
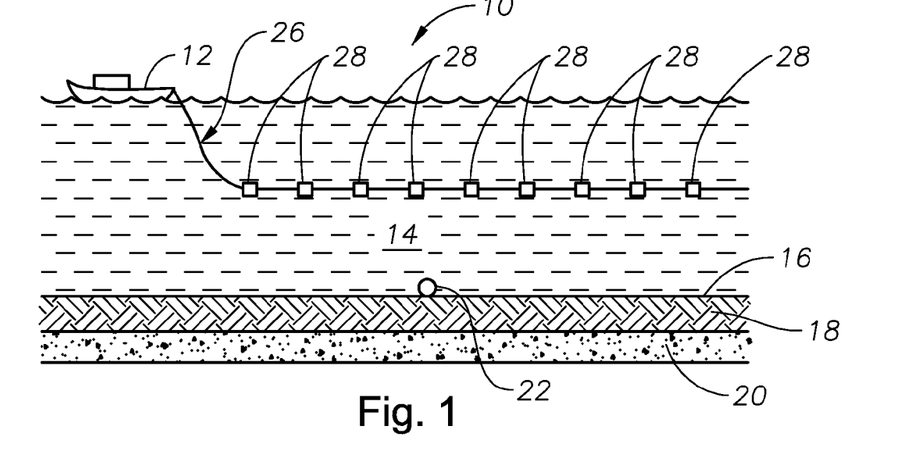
FIG. 1 illustrates an exemplary marine survey system.

FIG. 1 depicts an exemplary marine seismic survey system 10 which includes a source vessel 12 which is moving through a body of water 14 above a sea floor 16. FIG. 1 depicts two subterranean strata 18, 20 which underlie the sea floor 16; although those of skill in the art will recognize that typically there are a large number of such strata in any given instance. A seismic receiver cable 22 is disposed upon the sea floor 16 and, as shown in Prior Art FIG. 2, includes a number of individual seismic receivers 24, such as hydrophones, geophones, or similar devices of a type known in the art, for detecting a seismic signal and thereafter recording the signal or transmitting the signal to a distal storage device.

The source vessel 12 is towing a source array 26 in the water 14. The source array 26 incorporates a number of seismic sources 28. The seismic sources 28 are typically air guns of a type known in the art for producing a suitable acoustic signal which can propagate downwardly through the water 14 and into the strata 18, 20 below. In FIG. 1, there are nine seismic sources 28. However, those of skill in the art will understand that this is merely by way of example, and that there may be more or fewer than nine.

Figure 2:
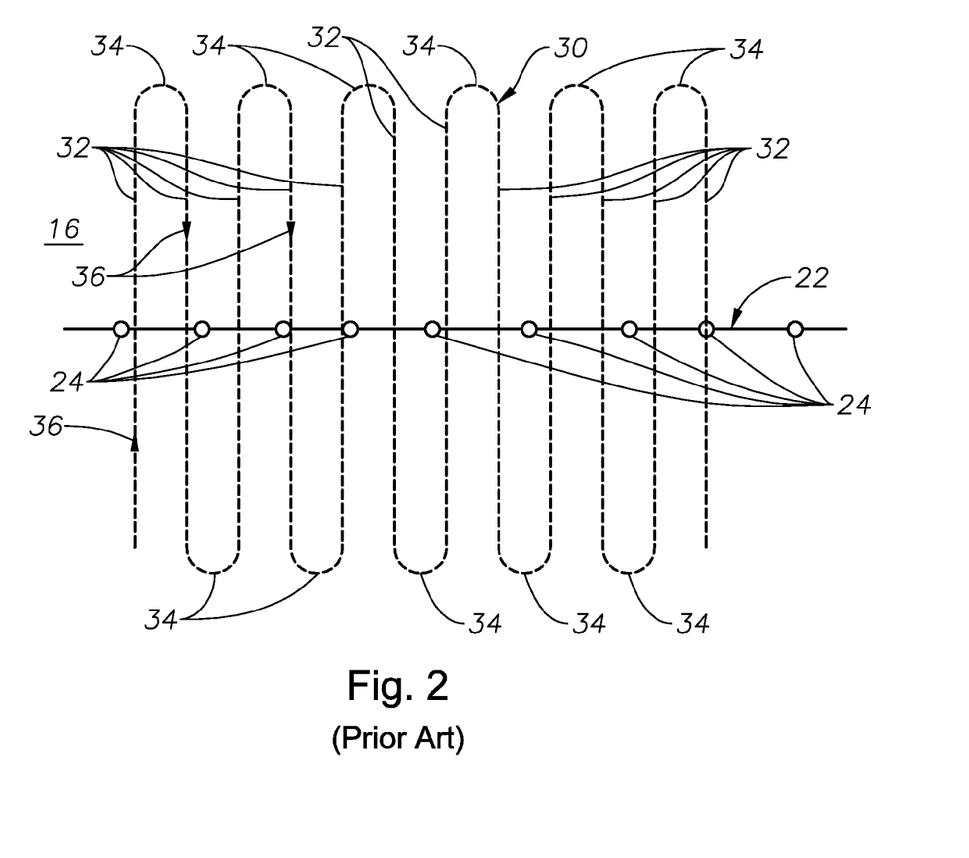
FIG. 2 is a representation of an exemplary prior art survey source line pattern.

As the source vessel 12 moves through the water 14, the seismic source array 26 is repeatedly actuated to create a series of acoustic signals at known intervals that propagate downwardly and are partially reflected off of the strata 18, 20 and the interfaces between the strata and are received at the receiver cable 22. FIG. 2 is a plan view depicting an exemplary cross-spread survey pattern which might be used by the survey system 10 in order to obtain data relating to the strata 18, 20 beneath the sea floor 16. The dashed line 30 illustrates an exemplary path that the source vessel 12 could take above the seismic receiver cable 22 while activating the seismic sources 28 to produce seismic data relating to the formations below the sea floor 16 proximate the cable 22. The path 30 includes a plurality of substantially parallel source lines 32 separated by turns 34. It is noted that the source lines 32 are substantially equal in length. The source vessel 12 would travel in the direction indicated by the arrows 36.

Figure 3:
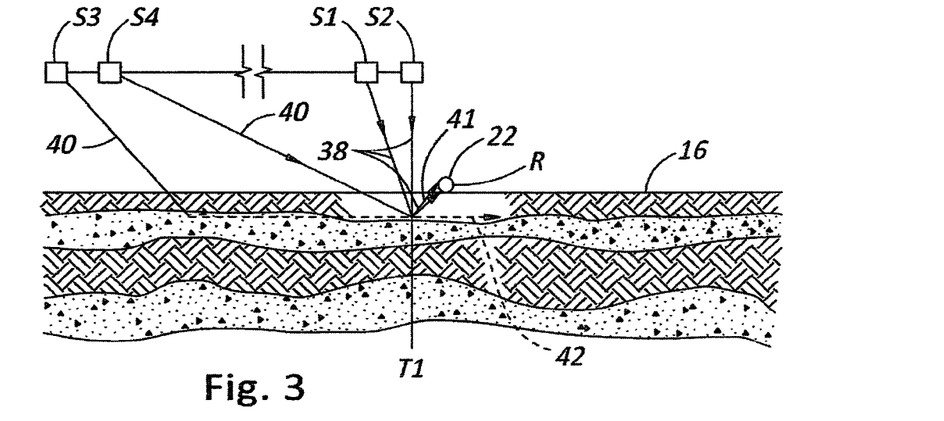
FIG. 3 illustrates the use of seismic sources and a receiver to image a relatively shallow target point.

More frequent and shorter source line lengths are useful for obtaining good imaging of relatively shallow targets. FIG. 3 is a schematic drawing depicting the surveying of an exemplary relatively shallow target point T1, which is located at approximately 2000 feet below the sea floor 16. Seismic rays 38 that originate from seismic source points S1 and S2 have short offset distances with respect to the receiver R and at least a portion of this seismic ray 38 will reflect back to the receiver R substantially along line 41. Seismic rays 40 that originate from seismic source points S3 and S4 have longer offset distances, and, as a result, are likely to refract off the target point T1 (as depicted by dashed line 42) rather than be reflected back to the receiver R. Therefore, the seismic rays 40 do not produce useable traces. The inventors have recognized, then, that for shallower targets, traces with longer offsets are less useful than those with shorter offsets and which are positioned substantially over the target point. Further, when using a longer source line length and a shallow target, most of the useful data is acquired when the seismic source points are located in relatively close proximity to a point directly above the target point T1.

Figure 4:
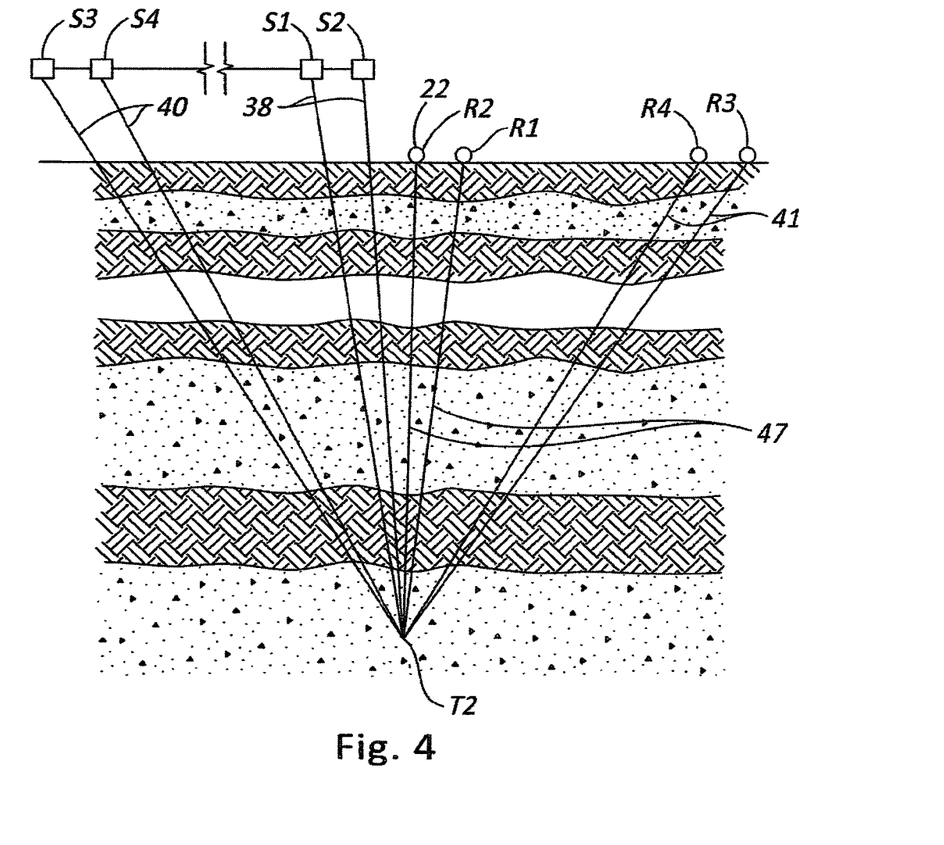
FIG. 4 illustrates the use of seismic sources and a receiver to image a relatively deep target point.

FIG. 4 illustrates the instance of imaging a deeper target (T2). Target point T2 is at a deeper location, for example, 20,000 feet below the sea floor 16) than target point T1. Seismic rays 38 originating from seismic source points S1 and S2 will be largely reflected back to the receiver R1, R2, respectively. Because there is a more acute angle of approach to the deeper target point T2, a significant portion of seismic rays 40 originating from seismic source points S3 and S4 will also be reflected back toward receivers R3 and R4 along lines 41. Therefore, there are more usable traces for deeper targets since traces with both short and long offsets provide useful data.

Figure 5:
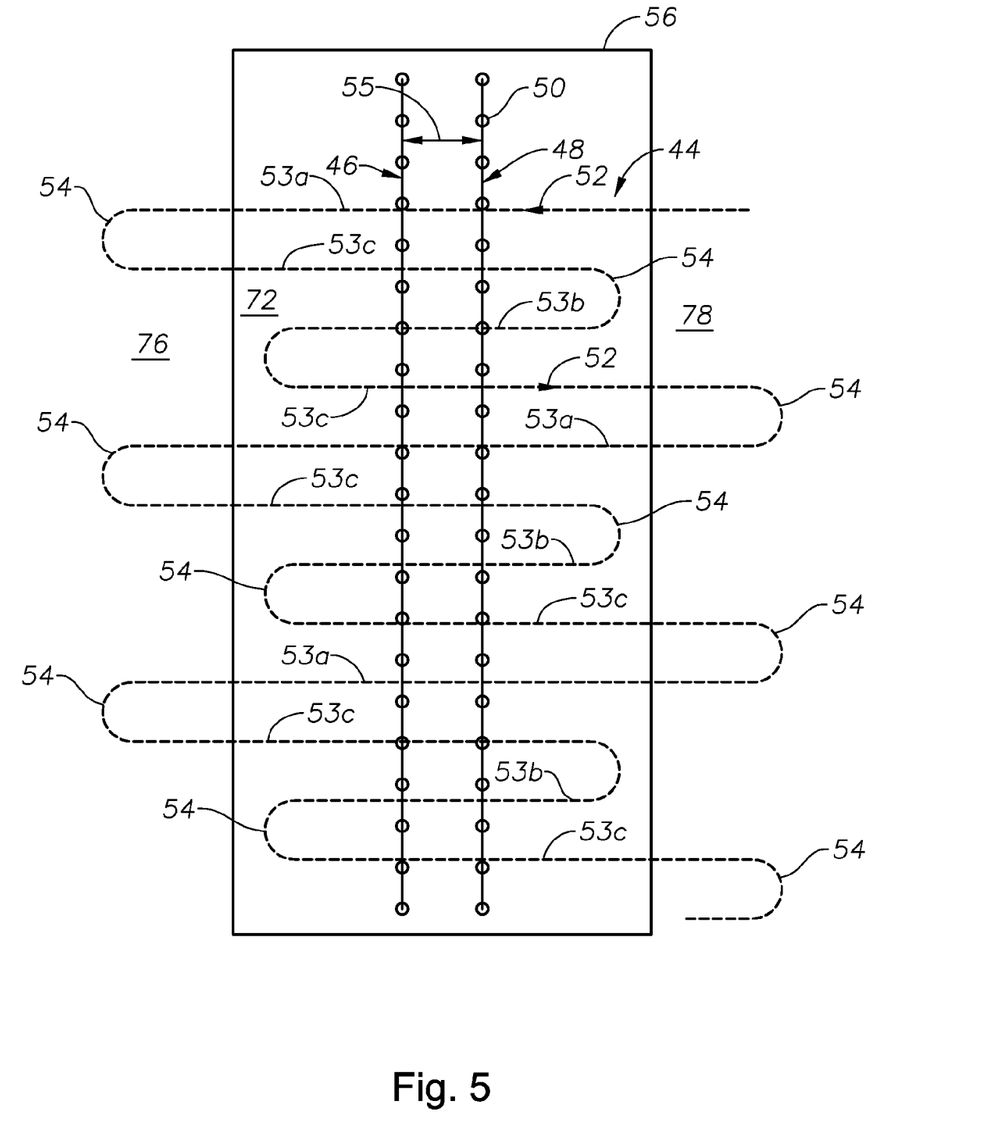
FIG. 5 illustrates an exemplary survey source line pattern for a single swath of data acquisition in accordance with the present invention.

FIG. 5 illustrates an exemplary survey pattern 44 for a source vessel and towed source array conducted in accordance with the present invention. It will be understood by those of skill in the art that the pattern 44 depicted in FIG. 5 may represent a portion of a larger survey pattern having a larger number of source lines. FIG. 5 depicts a pair of substantially parallel receiver lines 46 and 48. The receiver lines 46, 48 are each made up of a plurality of individual seismic receivers 50 which are arranged in substantially linear arrays. In one embodiment of the present invention, the receivers 50 are autonomous receivers, often known as "nodal" receivers, of a type known in the art and which are operable to detect and record acoustic energy on-board. In another embodiment of the present invention, the seismic receivers 50 are receivers, of a type known in the art, that will detect acoustic energy and then transmit it to a distal, typically surface-based recorder via telemetry. The receiver lines 46, 48 are preferably deployed along the sea floor 16, as described earlier. Also, the receivers 50 are preferably spaced in a substantially equidistant manner from one another along each of the receiver lines 46, 48. The survey pattern 44 depicts the path to be taken by a source vessel towing an array of seismic sources, as previously described. The source vessel tows the seismic array in the direction of arrows 52 in a series of substantially parallel and linear source lines 53 which are connected by turns 54, which are located at the linear ends of adjacent source lines 53. FIG. 5 depicts an exemplary pattern 44 wherein the source lines 53 are oriented in a generally orthogonal, or perpendicular, manner to the orientation of the receiver lines 46, 48. However, it is also contemplated that the source lines 53 could be oriented to intersect the receiver lines 46, 48 at a non-perpendicular angle, such as a 45 degree angle with respect to the direction of orientation of the receiver lines 46, 48. However, other angles of intersection (i.e., 30 degrees, 50 degrees, etc.) may also be used. A target zone 56 to be surveyed and imaged by the acquisition of seismic data by the survey pattern 44 is illustrated generally by boundary lines in FIG. 5.

It can be seen from FIG. 5 that not all of the source lines 53 are of the same length. In accordance with the present invention, at least two of the source lines 53 are of different lengths. FIG. 5 depicts a currently preferred embodiment wherein the survey pattern 44 includes source lines 53a that are of a first, longer length and source lines 53b, which have a length that is shorter than the first length. Currently preferred embodiments also include source lines 53c that are of an intermediate length that is greater than the length of the shorter source line 53b, but shorter than the length of the longer source line 53a. In further preferred embodiments of the present invention, the lengths of the different source lines 53a, 53b, 53c are related as multiples of a particular unit length such that the long source line 53a is four units in length, the short source line 53b is two units in length, and the intermediate source line 53c is three units in length. Using a unit length of 3,000 meters as an example, the long source lines 53a would be 12,000 meters in length, the intermediate source lines 53c would be 9,000 meters in length, and the short source lines 53b would be 6,000 meters in length. It is noted that the source lines 53a, 53b, 53c have been intentionally positioned so that the last shot point of any given source line 53a, 53b or 53c is at the same cross-line position (i.e., perpendicular to the receiver lines 46, 48) as the first shot point of the next source line 53a, 53b or 53c to be recorded. This provides for a minimum distance traveled by the source vessel 12 between the end of any shot line and the beginning of the next shot line, resulting in maximum efficiency of recording operations.

In another aspect of the present invention, it is currently preferred that the length of the source lines are related to the interval between the receiver lines 46, 48. Interval 55, depicted in FIG. 5, is the distance between the two receiver lines 46, 48. In presently preferred embodiments, the length of the short source line 53b is a certain minimum of an even multiple of the interval 55. In a further preferred embodiment, the short source line is at least four times the length of the interval 55. For example, if the interval 55 were 100 meters, the short source line 53b would be 400 meters in length or more. Using source line lengths that are an even multiple of the number of receiver lines 46, 48, multiplied by the interval 55 between the receiver lines 46, 48 ensures that the fold of coverage produced is consistent between adjacent swaths of coverage.

It is further currently preferred that the source lines 53a, 53b, 53c occur in an order within the survey pattern which permits alternating coverage of opposite sides of a central target area by the intermediate source lines 53c. In a currently preferred pattern 44 illustrated in FIG. 5, a source vessel follows a path wherein it traverses a long source line 53a followed by an intermediate length source line 53b and then a short source line 53b. Next, the vessel traverses an intermediate length source line 53b, a long source line 53a and an intermediate length source line 53b, and then the pattern is repeated.

As the pattern 44 is traversed by a source vessel 12, the seismic source array 26 is activated to create a series of acoustic energy shots in accordance with a predetermined scheme. This scheme may be based upon timed actuation of the seismic source array 26, GPS-determined location of the vessel 12, speed of the vessel 12, or in accordance with other suitable actuation schemes known in the art. Reflected acoustic energy from the target zone 56 is then detected by the seismic receivers 50 of the receiver lines 46, 48.

Figure 6:
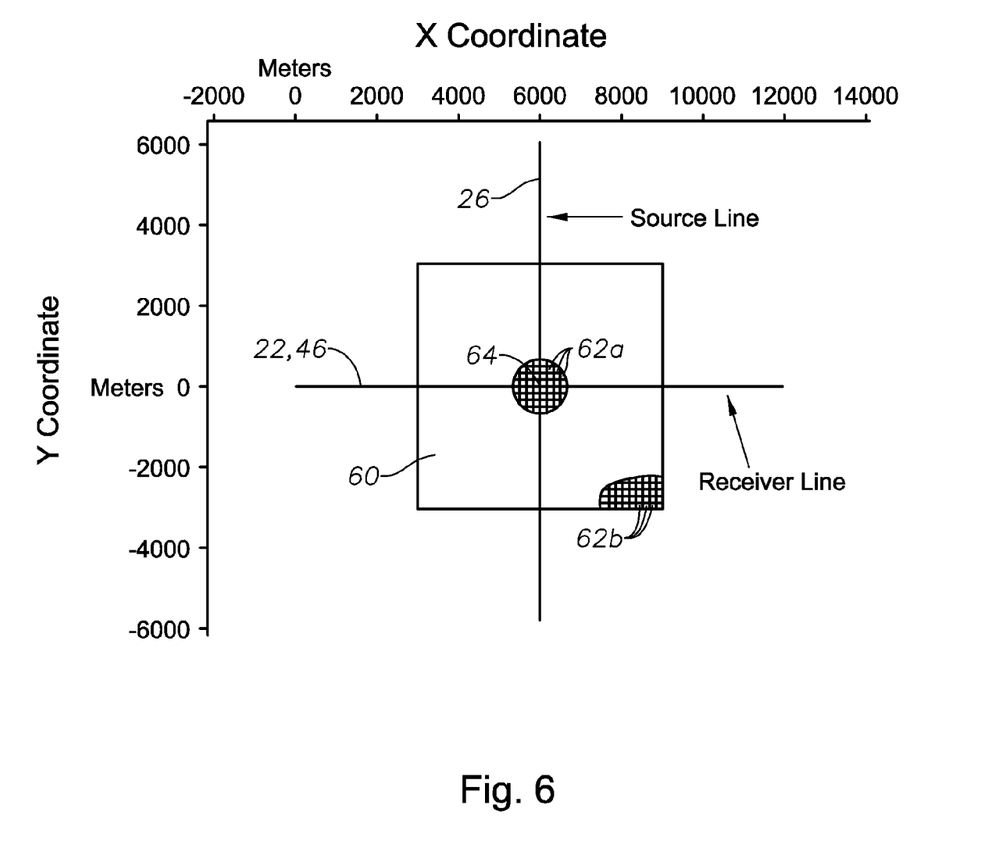
FIG. 6 depicts an exemplary cross-spread plot for a single fold of data.

FIG. 6 illustrates a graph that is representative of a single cross-spread fold of data between the seismic source line 32/53 and a single receiver line 22 or 46. The area of common midpoint coverage is indicated by the square 60. The square 60 is made up of a number of smaller squares, commonly known as bins, 62, as is known in the art. The intersection 64 between the source and receiver lines 32/53, 22/46 represents the location of the shortest offset distance between a seismic source 28 and receiver 24. Therefore, bins 62a in that area will be those with the shortest offset distance. On the other hand, those bins, such as 62b, proximate the outer periphery of the square 60 will have the longest offset distances.

Figure 7:
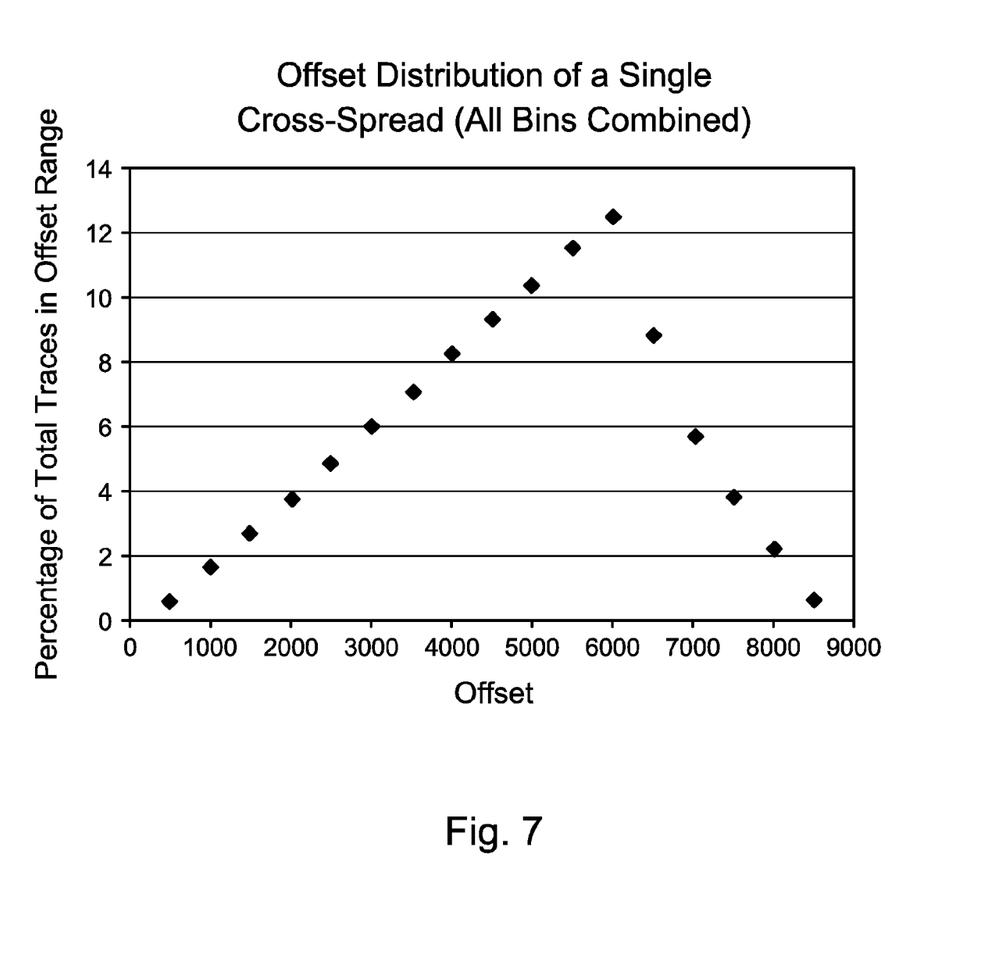
FIG. 7 is a graph depicting the offset distribution of a single cross-spread.

One consequence of a conventional cross-spread geometry for obtaining seismic data is that many more long offsets are recorded in each full fold bin as compared to short offsets. FIG. 7 depicts the offset distribution of a single cross-spread, by percentage, as taken along a long source line, such as source line 53a. As can be seen, the majority of traces have an offset that is 4000 meters or more in length. The inventors have recognized that longer offsets, while useful in providing geological data relating to deeper and intermediate depth targets, are less effective in providing useful data for shallower targets.

Figure 8:
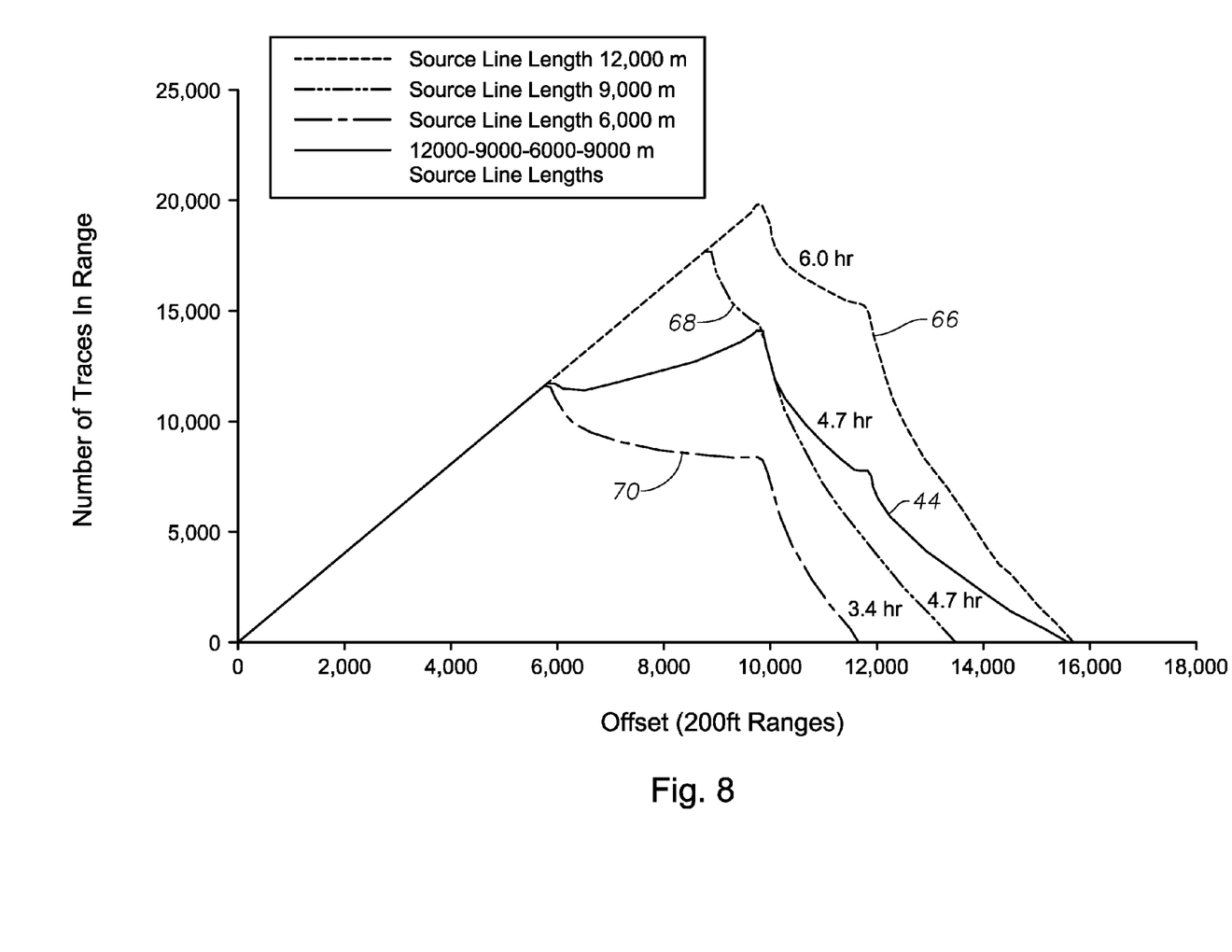
FIG. 8 is a graph depicting traces obtained and the offset distances of those traces according to four different exemplary source line survey patterns.

FIG. 8 is a graph which illustrates the number of traces obtained and the offset distances of these traces according to four different exemplary survey patterns. The first survey pattern is depicted by the dashed line 66 is a pattern which employs a source line length of 12,000 meters. This pattern requires a time of 6.0 hours to complete surveying of a hypothetical target zone. The second survey pattern is depicted by the dashed and dotted line 68 in FIG. 8. The second survey pattern utilizes a source line length of 9,000 meters. The second survey pattern 68 requires a survey time of 4.7 hours for the same target zone. The second pattern 68 requires a shorter survey time than the first survey pattern 66, which is desirable. However, the second survey pattern 68 excludes traces having longer offset distances. There are no traces with offset distances longer than around 13,500 meters. As a result, imaging for some deeper targets is sacrificed.

A third exemplary survey pattern is depicted by the dotted line 70 in FIG. 8. The third survey pattern uses a survey source line length of 6,000 meters. The third pattern requires a survey time of only 3.4 hours. However, the medium and long offset lengths are missing, with the longest offset lengths being slightly over 11,000 meters.

The fourth survey pattern is an exemplary survey pattern which is currently preferred in accordance with the present invention, and it is depicted by the solid line 44 in FIG. 8. The survey pattern 44 is also depicted in FIG. 5. The source line lengths in the fourth survey pattern 44 are in a sequence of 12,000 meters followed by a source line of 9,000 meters, then a source line of 6,000 meters, and then a source line of 9,000 meters. These sequences then repeat for the balance of the survey being conducted. This survey pattern requires a survey time of 4.7 hours to conduct. All of the patterns depicted in FIG. 8 provide a significant number of traces with a relatively short offset distance (i.e, less than 6,000 meters). The inventors consider the survey pattern 44 to be preferred since it provides a relatively short survey time (4.7 hours) while providing a mixture of traces having short and long offset lengths without excluding long offset length traces. In addition, the flatness of the curve for survey pattern 44 shows that a more even distribution of offset lengths (as among short, intermediate and long) is provided.

The order of the source lines in the preferred survey pattern 44 is advantageous since it provides relatively balanced lateral coverage of the survey area. Referring once again to FIG. 5, it can be seen that an equivalent amount of intermediate source line offset length is provided on each lateral side portion 72, 74 of the area defined between the receiver lines 46, 48 and the outer boundaries of the target area 56. There are portions of the source lines 53 and three turns 54 located in the lateral side portion 72 in FIG. 5, and there are portions of source lines 53 and three turns 54 located in the opposite lateral side portion 74. There is also substantially equivalent coverage of the target area 56 by longer offset distance traces on each of the distal lateral side portions 76, 78 which lie outside of the target zone 56. There are portions of source lines 53a and 53c in each of these side portions as well as three turns 54 in each.

Figure 9:
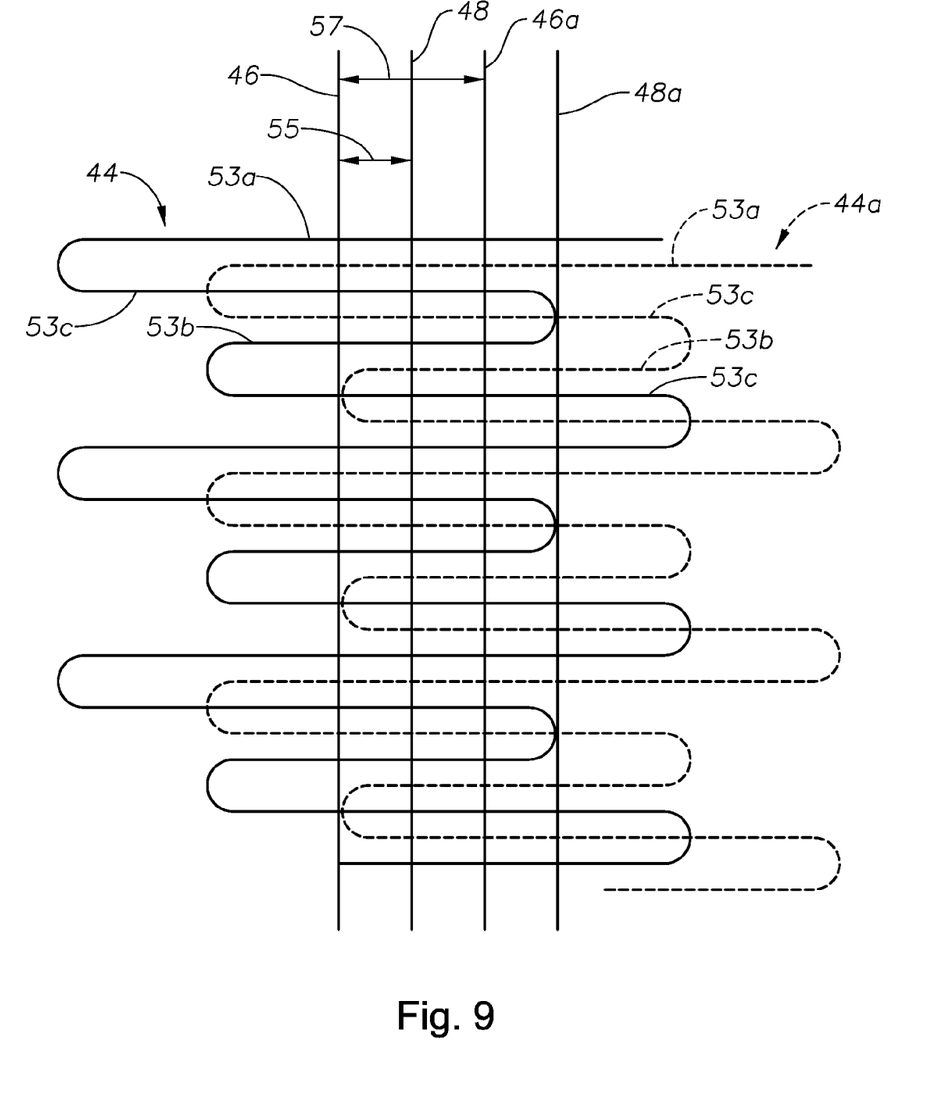
FIG. 9 depicts the use of two swaths of the survey pattern depicted in FIG. 5 in a rollover used to image an adjacent target area.

Following the completion of the survey pattern 44, the receiver lines 46, 48 are relocated to a second, adjacent location on the ocean bottom 16. Thereafter, the survey pattern 44 is conducted again in this adjacent location. FIG. 9 depicts an exemplary swath rolling technique wherein the receiver lines 46, 48 are moved from their initial locations (designated by 46, 48 in FIG. 9) to locations 46a, 48a, respectively, after the initial survey pattern 44 has been completed. After movement of the receiver lines 46, 48 to the new locations 46a, 48a, a second survey pattern 44a is then conducted. The new locations 46a, 48a are preferably based upon the interval distance 55 between the two receiver lines 46, 48. The distance that the receiver lines 46, 48 are moved (the "rollover distance" 57) is preferably twice the interval distance 55. For example, if the interval 55 is 100 meters, then the swath rolling distance 57 should be 200 meters. This results in a uniform layout of receiver lines.

The second survey pattern 44a is preferably identical to the first survey pattern 44. As can be seen from FIG. 9, the second survey pattern 44a overlaps and is interleaved with the first survey pattern 44. The patterns 44, 44a are overlapping since the source lines 53a, 53b and 53c of the second pattern 44a extend onto and overlap the first pattern 44. The patterns 44, 44a are also interleaved since the source lines 53a, 53b and 53c of the second pattern 44a are located laterally between the source lines 53a, 53b and 53c of the first pattern. As a result, coverage is optimized.

Figure 10:
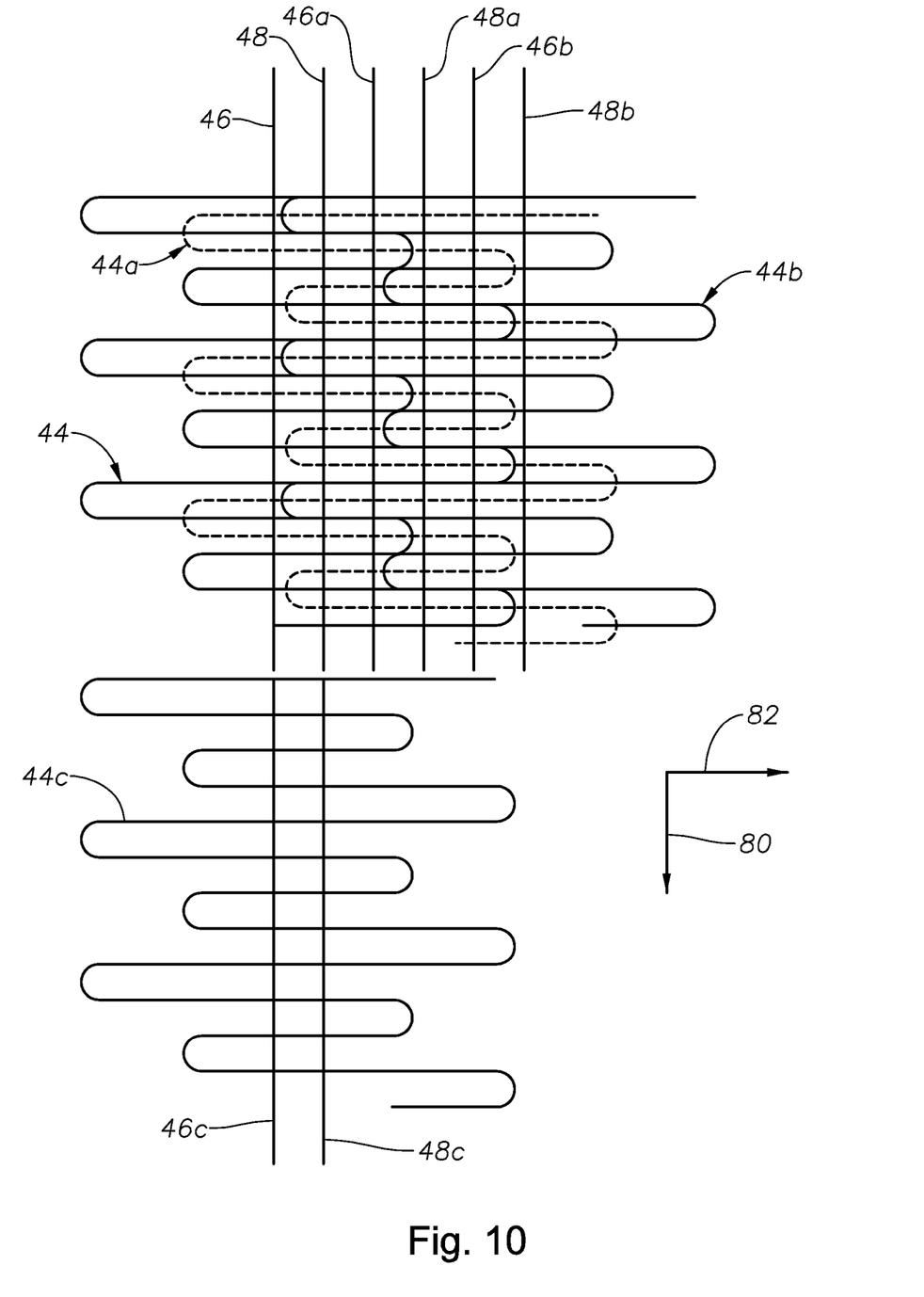
FIG. 10 is a plan view of a larger target area made up of a number of overlapping survey patterns.

As FIG. 10 illustrates, the survey pattern and swath rolling process is repeated with the receiver lines 46, 48 being moved in both the cross-line direction 82 and in-line direction 80. FIG. 10 depicts further subsequent locations 46a, 48a, 46b, 48b and 46c, 48c for the receiver lines 46, 48. Locations 46a, 48a and 46b, 48b are subsequent locations in the cross-line direction 82 while the locations 46c, 48c are exemplary subsequent locations in the in-line direction 80. In FIG. 10, a larger scale survey area is shown which is made up of a number of individual survey patterns 44, 44*a*, 44*b* and 44*c* which are double overlapped by virtue of being overlapping and interleaved. It will be appreciated that having a number of contiguous survey areas will result in imaging of a larger area.

Figure 11:
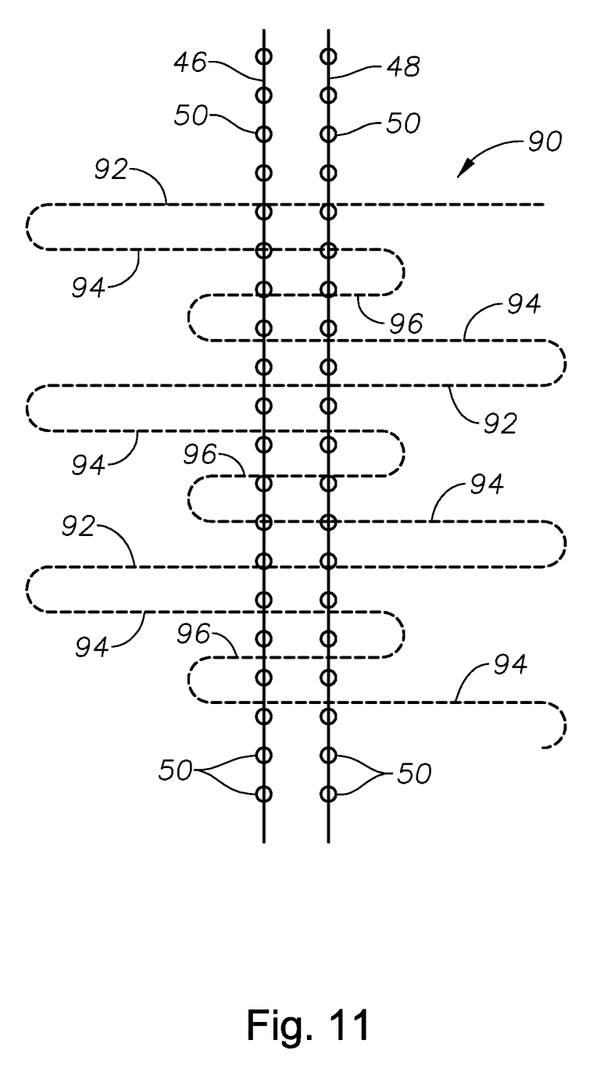
FIG. 11 is a plan view of an alternative survey pattern in accordance with the present invention.
Figure 12:
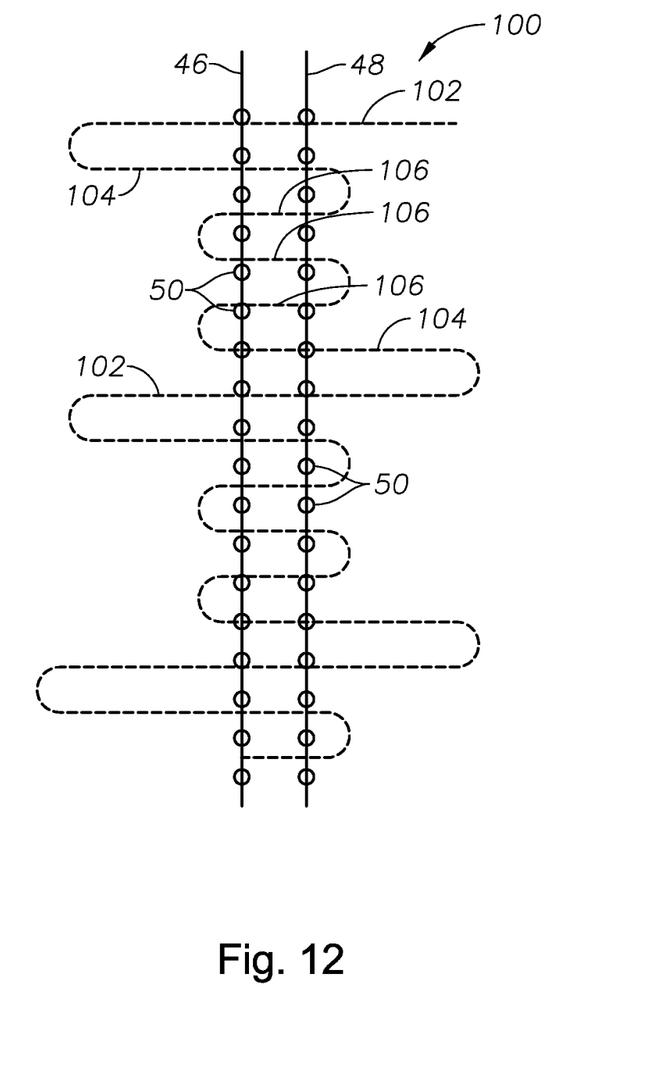
FIG. 12 is a plan view of a further alternative survey pattern in accordance with the present invention.

FIGS. 11 and 12 depict two alternative survey patterns in accordance with the present invention. FIG. 11 illustrates an exemplary survey pattern 90 which includes first, long source lines 92, intermediate length source lines 94 and short source lines 96. In a preferred embodiment, the long source line 92 is three units in length, the intermediate length source line 94 is two units in length, and the short source line 96 is one unit in length. As an example, if the unit length is 2000 meters, the long source line 92 would be 6000 meters, the intermediate length source line 94 would be 4000 meters in length, and the short source line would be 2000 meters in length. A currently preferred order for the sequence of the source lines 92, 94, 96 in the survey pattern 90 is: a long source line 92, intermediate length source line 94, short source line 96, and then an intermediate source line 94. However, there are also other sequences for the source lines 92, 94, 96 which would also be effective and yield good imaging results. For example, the source lines could be sequenced as: long 92, long 92, intermediate 94, short 96, intermediate 94, long 92, long 92, intermediate 94, short 96, intermediate 94, and long 92. In another example, the source lines could be sequenced as: long 92, intermediate 94, short 96, short 96, short 96, intermediate 94, and long 92.

FIG. 12 illustrates a further exemplary survey pattern 100 in accordance with the present invention. The survey pattern 100 includes first, long source lines 102, intermediate length source lines 104, and short source lines 106. In a currently preferred embodiment, the long source line 102 is eight units in length, the intermediate length source line 104 is five units in length, and the short source line 106 is two units in length. A currently preferred order for the sequence of the source lines 102, 104, 106 is: a long source line 102, three short source lines 106, and an intermediate length source line 104. Thereafter, the sequence is repeated. There are other sequences for the source lines 102, 104 and 106 which could also be used to yield good imaging results. For example, the source lines 102, 104, 106 could be sequenced as long 106, intermediate 104, short 102, intermediate 104, and long 102.

Those of skill in the art will recognize that numerous modifications and changes may be made to the exemplary designs and embodiments described herein and that the invention is limited only by the claims that follow and any equivalents thereof.

What is claimed is:

1. A method of acquiring three-dimensional marine seismic data having optimized subsurface coverage while minimizing an amount of time required to acquire the seismic data, comprising:
   providing a substantially linear array of a plurality of acoustic energy receivers disposed upon or proximate to the sea floor to form a receiver line;
   providing a plurality of acoustic energy source points to form a source array;
   towing the source array behind a source vessel near or on the surface of the water above the receiver line and along a repeating survey pattern having a plurality of substantially linear source lines that are substantially parallel to each other and each of which intersects the receiver line, the survey pattern comprising:
      at least one long source line having a first length;
      at least one intermediate source line having a second length that is less than the first length;
      at least one short source line having a third length that is less than the second length;
      a sequence of long source lines, intermediate source lines and short source lines, wherein the amount of time required to complete the repeating survey pattern and acquire the seismic data is minimized while also maintaining balanced offset coverage of the subsurface;
   actuating the acoustic energy sources to produce acoustic energy at predetermined intervals while moving along the source lines and
   detecting reflected acoustic energy with the receivers of the receiver line.

2. The method of claim 1, wherein the first source line has a length of about four units, the second source line has a length of about three units, and the third source line has a length of about two units.

3. The method of claim 1, wherein source lines in the repeating survey pattern are followed in the order of:
   a long source line;
   an intermediate source line;
   a short source line and
   an intermediate source line.

4. The method of claim 1, further comprising the step of moving the receiver line to a new location and then repeating the first survey pattern with respect to the new location.

5. The method of claim 4, wherein the repeated survey pattern overlaps the previous survey pattern.

6. The method of claim 1, further comprising repeating the survey pattern wherein source lines within the repeated survey pattern are interleaved between source lines of the previous survey pattern.

7. The method of claim 1, wherein there is a plurality of receiver lines.

8. The method of claim 1, wherein the acoustic energy receivers are autonomous nodal receivers.

9. The method of claim 1, wherein the first source line has a length of about three units, the second source line has a length of about two units, and the third source line has a length of about one unit.

10. The method of claim 9, wherein the source lines in the repeating survey pattern are followed in the order of:
    a long source line;
    an intermediate source line;
    a short source line and
    an intermediate source line.

11. The method of claim 1, wherein the first source line has a length of about eight units, the second source line has a length of about five units, and the third source line has a length of about two units.

12. The method of claim 11, wherein the source lines in the repeating survey pattern are followed in the order of:
    a long source line;
    an intermediate source line;
    a short source line;
    a short source line;
    a short source line;
    an intermediate source line.

13. A method of acquiring three-dimensional marine seismic data having optimized subsurface coverage while minimizing an amount of time required to acquire the seismic data, comprising:
    providing a plurality of acoustic energy receivers disposed upon or proximate to the sea floor to form a plurality of receiver lines;

providing a plurality of acoustic energy sources to form a source array;

towing the source array behind a source vessel near or on the surface of the water above the receiver lines and along a first repeating survey pattern having a plurality of substantially linear source lines that are substantially parallel to each other and each of which intersects the receiver lines, the survey pattern comprising:

at least one long source line having a first length;

at least one intermediate source line having a second length that is less than the first length;

at least one short source line having a third length that is less than the second length;

a sequence of long source lines, intermediate source lines and short source lines, wherein the amount of time required to complete the repeating survey pattern and acquire the seismic data is minimized while also maintaining balanced offset coverage of the subsurface;

actuating the acoustic energy sources to produce acoustic energy at predetermined intervals while moving along the source lines and detecting reflected acoustic energy with the receivers of the receiver lines.

14. The method of claim 13, wherein the first source line has a length that is about four units, the second source line has a length that is about three units, and the third source line has a length that is about two units.

15. The method of claim 14, wherein source lines in the repeating survey pattern are followed in the order of:

a long source line;
an intermediate source line;
a short source line and
an intermediate source line.

16. The method of claim 13, further comprising the step of moving the receiver lines to new location and then repeating the survey pattern with respect to the new location.

17. The method of claim 16, wherein the repeated survey pattern overlaps the previous survey pattern.

18. The method of claim 1, further comprising minimizing the distance traveled by the source vessel by arranging the sequence of long source lines, intermediate source lines and short source lines such that a long source line may only be followed by a long source line or an intermediate source line, and a short source line may only be followed by a short source line or an intermediate source line.

19. The method of claim 1, further comprising minimizing the distance traveled by the source vessel by locating the start of a source line at substantially the same distance perpendicular to the receiver line as the end of the previous source line.

20. The method of claim 13, further comprising minimizing the distance traveled by the source vessel by arranging the sequence of long source lines, intermediate source lines and short source lines such that a long source line may only be followed by a long source line or an intermediate source line, and a short source line may only be followed by a short source line or an intermediate source line.

21. The method of claim 13, further comprising minimizing the distance traveled by the source vessel by locating the start of a source line at substantially the same distance perpendicular to the receiver lines as the end of the previous source line.

* * * * *